United States Patent [19]
Badgley

[11] Patent Number: 5,100,328
[45] Date of Patent: Mar. 31, 1992

[54] MEMORY SCANNING DEVICE

[76] Inventor: Laurence E. Badgley, 1020 Foster City Blvd., Foster City, Calif. 94404

[21] Appl. No.: 468,566

[22] Filed: Jan. 23, 1990

[51] Int. Cl.$^5$ ............................................... G09B 5/00
[52] U.S. Cl. .................................... 434/308; 351/158; 434/112
[58] Field of Search .................... 351/50, 210, 158; 358/93, 3; 434/308, 112

[56] References Cited

U.S. PATENT DOCUMENTS

| | | | |
|---|---|---|---|
| 3,463,885 | 8/1969 | Upton | 434/112 X |
| 3,923,370 | 12/1975 | Mostrom | 358/93 |
| 3,936,605 | 2/1976 | Upton | 351/50 |
| 4,804,328 | 2/1989 | Barrabee | 434/308 |
| 4,852,988 | 8/1989 | Velez | 351/210 |
| 4,853,764 | 8/1989 | Sutter | 358/3 |
| 4,902,120 | 2/1990 | Weyer | 351/158 |

Primary Examiner—Richard J. Apley
Assistant Examiner—Philip Kubel
Attorney, Agent, or Firm—T. R. Zegree

[57] ABSTRACT

A memory scanning device for transmission to the brain of material sought to be learned and of modification of addictive problems comprises, in combination, a computer means including video and audio components, an illuminated by diodes visor having reflective undersurface, modified eyeglasses frame having a pair of mirrors mounted in their openings for reading the computer-stored material and a pair of sound-producing loudspeakers for listening to the recorded computerized material.

17 Claims, 2 Drawing Sheets

AUDIO/VIDEO CONTROL SYSTEM

MEMORY SCANNING DEVICE

BACKGROUND OF THE INVENTION

This invention relates to an improved memory scanning device. More particularly, the invention relates to an apparatus adapted specifically to facilitate learning and memorizing process by stimulating memory function of the brain.

Various devices designed to improve teaching or learning methods have been described in the patent literature. For example, U.S. Pat. No. 3,534,484 to Sumter discloses a learning aid adapted to shield a person from audible distractions and comprising a visual shield, an audio shield and a sound/tone generator connected to a sound/tone transmitter. U.S. Pat. No. 3,923,370 to Mostrom describes a helmet having a transparent visor and comprising a projection apparatus which transmits light to a reflective system of the visor thereby displaying desired images. U.S. Pat. No. 4,340,972 to Heist covers a teaching apparatus for instructing students when the teacher is at some distance therefrom comprising a transmitter portion, a receiver portion and a prompter portion, each portion being disposed in a separate, self-contained unit for use in activities involving considerable mobility, such as skiing. U.S. Pat. No. 4,775,322 to Behunin teaches an apparatus for increasing reading speed comprising a tape player, headphones to block out exterior sounds and blind goggles provided with stenopaic slits to focus the sight on the reading material, thereby improving the reader's ability to concentrate. U.S. Pat. No. 4,804,328 to Barrabec describes a student interactive teaching system allowing the student to learn at a level of skill appropriate to his abilities comprising a videodisc data storage device and a retrieval device therefor in combination with a microcomputer and a host computer.

While the above-mentioned patents disclose various concepts of improving learning skills, the present invention provides a new approach to the structure of a scanning device adapted to stimulate the brain function and to increase markedly the speed of acquiring new knowledge to be learned and remembered.

OBJECTS OF THE INVENTION

In view of the foregoing, it is the principal object of this invention to provide a new device enhancing memory learning process by scanning synchronized audible and visual material.

Another object of the invention is the provision of a novel device, the structure of which is adapted for wearing on the user's head and which permits rapid assimilation of computer-stored material to be retrained in the user's mind by combined audio/visual technique.

Still another object of the invention is to provide a portable device useful not only for improvement of learning procedure or memorization, but which is also highly effective in behavior modification of addictive problems.

An even further object of the invention is to provide a scanning device which can be manufactured from readily available components at a relatively low cost.

These and other objects of the invention will become more fully apparent from the following description taken in conjunction with the accompanying drawing.

BRIEF SUMMARY OF THE INVENTION

In accordance with the present invention, there is provided a memory scanning device to facilitate learning, comprising, in combination: (a) a housing enclosing a computer means disposed inside thereof and including, as essential components, audio means and video means for storage of material to be learned; (b) a pair of sound-producing means electrically connected to said audio means for listening to material stored in said audio means; (c) an eyeglasses frame having a pair of lens-free openings, a central bridge portion and a pair of elongated temple members extending outwardly therefrom; (d) a pair of image-reflecting means secured angularly to said frame within said openings; (e) an elongated, rigid, hollow tube mounted upwardly on said central bridge portion; (f) a visor having a reflective surface, said visor being secured adjustably to upper end of said tube and electrically connected to said video means; and (g) a plurality of light-emitting diodes mounted on the underside of said visor and electrically connected to said video means to illuminate reflected image to be transmitted to the user's eyes.

BRIEF DESCRIPTION OF THE DRAWING

In the accompanying drawing, wherein like reference characters designate corresponding elements throughout the views thereof.

DETAILED DESCRIPTION OF THE INVENTION

Figure 1:
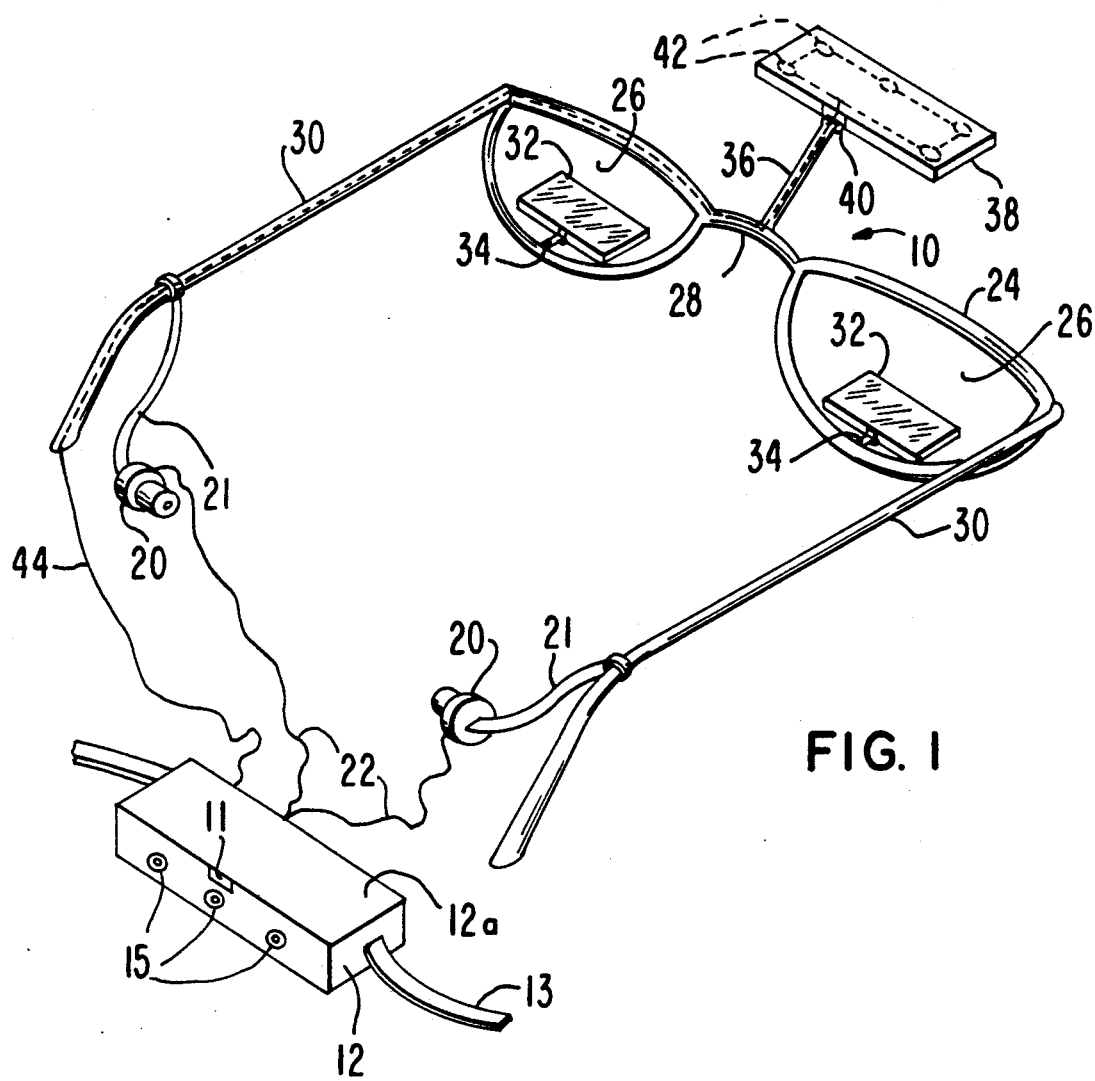
FIG. 1 is a perspective view of the device in accordance with the invention.
Figure 2:
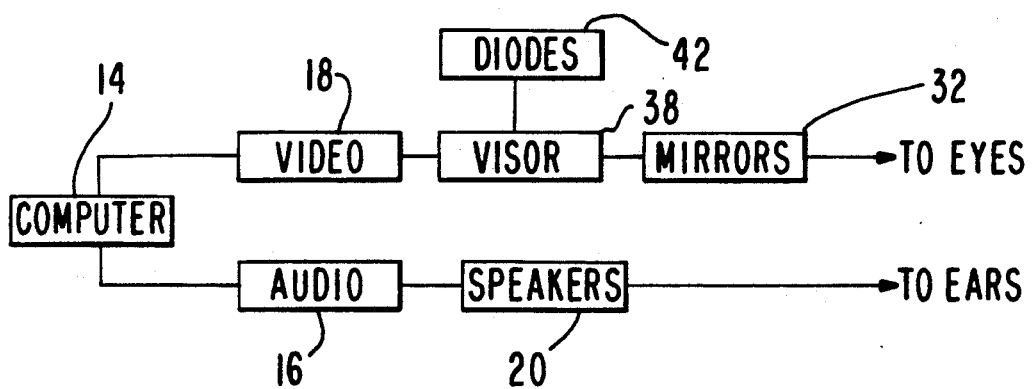
FIG. 2 is a functional block diagram illustrating the essential components of the device.

Referring now to the drawing with particular reference to FIG. 1, memory scanning device 10 comprises a housing 12 for computer 14 and other components connected therewith in the form of a rectangular-shaped box having a top wall 12a hingedly attached to the upper edge of adjoining side wall and provided with a suitable closure means 11 adapted to close housing 12 during operation of the device 10 and to open it for easy access to various components disposed in the interior of the housing. Housing 12 may be provided with a belt or strap 13 fastened appropriately to opposite sides thereof and having a closure means (not shown), such as a buckle, to be worn by the user around the waist, so that the entire device 10 attached to the user's body as a single unit may be operated in the course of various activities, such as walking, running, bicycle riding, vehicle driving, etc. Optionally, housing 12 without strap 13 may be operated by placing it on any suitable surface, such as a desk or a table when the user remains in one place for a period of time.

Figure 3:
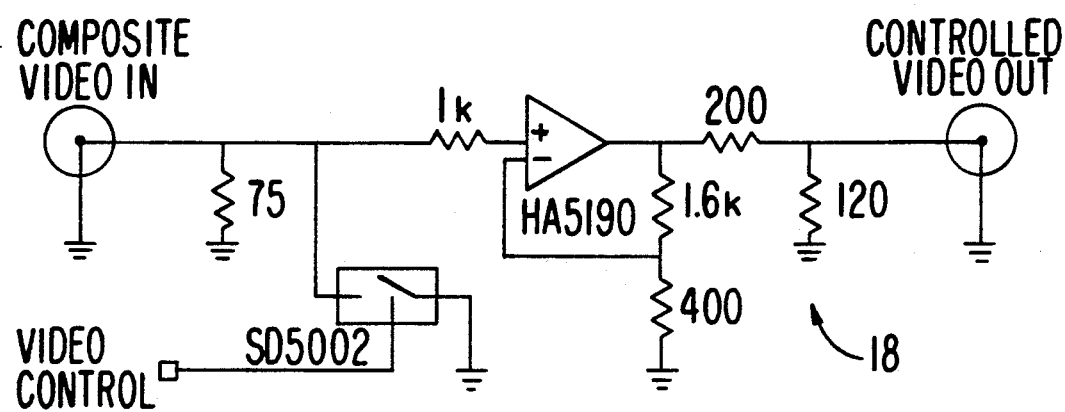
FIG. 3 is a diagram showing the electronic schematics of the audio/video control system connected with the computer in accordance with the invention.
Figure 3:
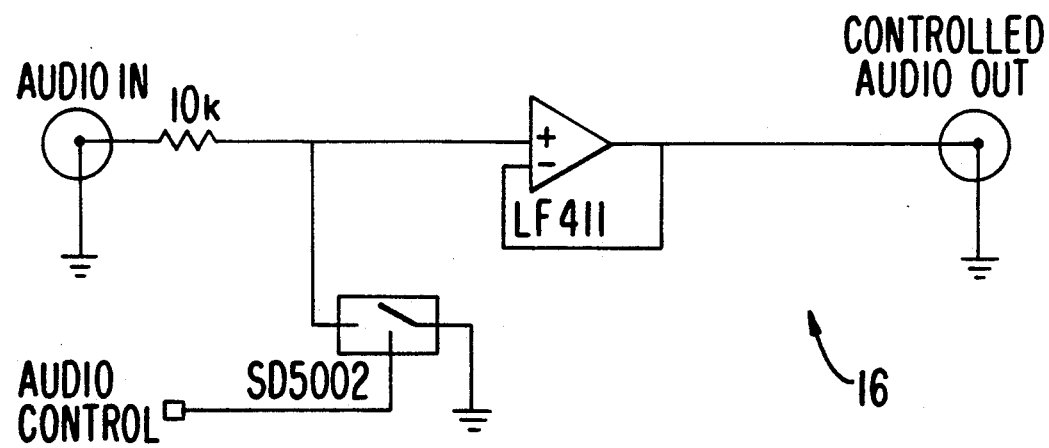

Computer means 14 is adapted to coordinate the operation of device 10 using control knobs 15 on an outer side wall of housing 12 which permit suitable processing of the stored material to be learned and of the functions of the computer by adjusting light and sound intensities, so that the output signal can be seen and heard distinctly, as well as the duration of the transmission of the material sought to be learned to the user's brain. Computer means 14 is connected with the components essential for the operation of device 10, i.e. audio means 16 and video means 18, both disposed in housing 12, the details of such components of the control system being shown in FIG. 3. Audio means 16 may be in the form of a magnetic tape having electronic impulses recorded thereon and mounted on a standard pair of rotating reels, or a magnetic disk mounted for rotation on a conventional turntable, or a laser disk built-in in a suitable laser drive. Such audio components, known in the art, for reproduction of sound, may preferably be of a high storage capacity in the range of about 680 megabytes to insure a transmission of the recorded material for a long period of time without necessity of rewinding. Video means 18 comprises a conventional playback device which transmits information previously recorded thereon onto a disk or a tape.

The sound-producing means comprises preferably a pair of small, high quality loudspeakers 20 connected by suitable electric conductors 22 to audio means 16 and adapted for insertion into the external auditory ear canal or for placement on the user's skin surface behind the ears adjacent the mastoid bones for conduction/transmission of sound to the brain. Loudspeakers 20 are mounted near end portions of temples 30 by adjustable flexible fasteners 21, such as universally jointed brackets or the like adapted for rotation so that loudspeakers 20 may be readily placed in the designated locations.

The material to be learned is fed into computerized video means 18 in a well known manner for transfer of image electronically from the playback device which transmits a modulated electronic signal to diodes 42 attached to the underside of visor 32 and then to the user's eyes simultaneously with transfer of reproduced audible sounds so that a person can see and hear a programmed material at the same time. The retrieval of material to be learned which is stored in a video disk or tape installed in housing 12 is effected through visor 38 in the form of a lightweight flat or slightly curved opaque or translucent plate mounted securely for rotation on top of telescopic hollow tube 36 serving as a support therefor and extending generally in vertical direction from central bridge 28 of frame 24 for a distance of from about 6 in. to 12 in. above bridge 28 so that it forms an integral extension thereof. Visor 38 is affixed by a suitable fastener member 40, such as a universal joint, to tube 36 for tiltable rotation of up to 90° downwardly and about 60° upwardly from its position in a horizontal plane. Although various materials can be used for making a suitable visor, a thin metallic or plastic plate having a reflective surface is preferred. Optionally, the undersurface of visor 38 may be mirrored. Hollow tube 36 is likewise fabricated from a lightweight rigid metal or plastic.

Visor 38 is provided with a plurality of diodes, preferably of the liquid crystal type, affixed to the underside reflective surface adjacent its perimeter and are electrically interconnected in series by suitable conductors 44 and connected to video means 18 to illuminate the computerized reading material displayed on the visor 38 and to convey colored moving image signal generated by video means 18 to be perceived by the user's eyes.

The video image is displayed on visor 38 by a known in the art LCDP (liquid crystal display panel) usually provided in personal portable computers of the "laptop" type and which sends an image in black and white or in various shades of gray.

An important structural element of device 10 is eyeglasses frame 24 adapted to be placed in the usual manner on the user's nose. Frame 24 differs from standard frames utilized for corrective vision in two respects. First, frame 24 is lens-free, i.e. openings 26 normally positioned opposite the eyes of the wearer are devoid of lenses. Secondly, a support temple 30 is hollow to allow the passage of electrical conductor 44 therethrough in the manner shown in dashed lines in FIG. 1. However, if desired, conductor 44 may optionally connect video means 18 with visor 38 exteriorly of frame 24. When conductor 44 is concealed inside temple 30, it passes through a hollow portion of frame 24, a hollow portion of bridge 28 and upwardly through hollow tube 36.

Another important feature of the invention is provision of a pair of image-reflecting means 32 which are secured angularly by suitable fasteners 34 to the lower portion of frame 24 and are disposed within openings 26, as illustrated in FIG. 1. Image-reflecting means 32 are preferably in the form of small rectangular mirrors, the reflective surface of which being directed toward the user's eyes. The mirrors are adjustably inclined to a suitable angle in the range of between about 30° and 60° in relation to horizontal plane so that an image generated by computer means 14, transmitted to reflective surface of visor 38 and then to reflective surfaces of mirrors 32 can be seen clearly by the user's eyes. Alternatively, small prisms may be employed as image-reflecting means 32 instead of mirrors.

It will be understood that computer means 14 also comprises well known in the art means of reversing the image reflected by mirrors 32 to enable the user to read the recorded material, as well as the conventional "on" and "off" switches, fast-forward, rewind functions and cue controls.

While the device 10 of the invention may be used as a single unit when attached to the user's body, as described hereinabove, all the elements with the exception of computer means 14 may be secured to a suitable headgear to be worn on the user's head. Such arrangement may be helpful to persons wearing corrective eyeglasses, whereby eyeglasses frame 24 according to the invention is placed over the corrective eyeglasses.

It will be apparent from the foregoing description that I have devised a highly effective and simply constructed device characterized by cooperating dual image-reflecting surfaces disposed in a predetermined angular relationship for use in improving learning techniques replacing advantageously the traditional studying approach. The device is useful in increasing considerably the activity of the brain cells and subliminal learning function, particularly in a tedious study of foreign languages based on characters or symbols different from those in modern languages, such as Asian, Middle Eastern or Cyrillic. The device of this invention serves as a helpful tool not only to persons having normal ability, but also to those having some learning disability by providing storage facilities for recorded material sought to be learned, its retrieval by simultaneous auditory and visual functions and a rapid assimilation by the user's brain. The use of my scanning device may reduce significantly the learning process of a difficult subject matter by as much as one-half of the time required to learn such subject matter by a conventional studying technique. Moreover, while the device of the invention can be used by a person in privacy, it does not necessitate elimination of external visual or audible interferences, as the recorded material is transmitted directly to the brain regardless of the environmental noise.

Another important feature of the invention is that the device is helpful in behavior modification of addictive problems to persons ruining themselves with drugs, excessive alcohol intake, cigarette smoking or excessive weight, by repetitive transmissions of pictorial and audible messages depicting harmful effects of such addictions and thereby discouraging such injurious habits. In addition to the uses described hereinabove, my device can also serve as an auditory and visual stimulator useful for entraining brain waves into the alpha range of brain wave activity with built-in means of modulating sound and light.

It will be understood that various modifications in the form or in the constructional details of my invention as herein described in its preferred embodiment may be made without departing from the spirit thereof or the scope of the claims which follow.

I claim:

1. A memory scanning device to facilitate learning comprising, in combination:
   (a) a housing enclosing computer means disposed inside thereof and including audio means and video means for storage of material to be learned;
   (b) a pair of sound-producing means electrically connected to said audio means for listening to material stored in said audio means;
   (c) an eyeglasses frame having a pair of lens-free openings, a central bridge comprising a hollow portion and a pair of elongated temple members extending outwardly therefrom, one of said temple members being hollow;
   (d) a pair of image-reflecting means secured angularly to said frame within said openings;
   (e) an elongated, rigid, hollow tube mounted upwardly on said central bridge portion;
   (f) a visor having a reflecting surface, said visor being secured adjustably to upper end of said tube and connected electrically to said video means; and
   (g) a plurality of light-emitting diodes mounted on the underside of said visor and electrically connected to said video means to illuminate reflected image to be transmitted to user's eyes.

2. A device of claim 1 wherein said housing comprises a top wall hingedly secured thereto for opening and closing of said housing.

3. A device of claim 1 wherein said housing comprises a pair of straps for attachment thereof around the waist.

4. A device of claim 1 wherein said housing includes exteriorly located knobs for control of functions of said computer means.

5. A device of claim 1 wherein said audio means comprises a magnetic tape.

6. A device of claim 1 wherein said audio means comprises a laser disk.

7. A device of claim 1 wherein said audio means comprises a magnetic disk.

8. A device of claim 1 wherein said hollow tube is telescopic extending vertically from about 6 inches to about 12 inches above said central bridge.

9. A device of claim 1 wherein said visor comprises a lightweight, flat plate rotatably mounted on said tube for rotation of up to about 90° downwardly and about 60° upwardly from horizontal plane.

10. A device of claim 1 wherein said diodes are of liquid crystal type electrically connected in series.

11. A device of claim 1 wherein said sound-producing means comprises loudspeakers adapted for insertion into the external auditory ear canal.

12. A device of claim 1 wherein said sound-producing means comprises loudspeakers adapted for placement on skin surface adjacent mastoid bones.

13. A device of claim 1 wherein said image-reflecting means are mirrors adjustably inclined to an angle of between about 30° and 60° in relation to horizontal plane.

14. A device of claim 1 wherein said image-reflecting means comprise prisms.

15. A device of claim 1 wherein an electrical conductor interconnects said video means with said visor and said diodes.

16. A device of claim 15 wherein said electrical conductor extends from said video means through interior of said temple member, upper portion of said frame, said central bridge and said tube.

17. A device of claim 15 wherein said electrical conductor extends from said video means exteriorly of said frame.

* * * * *